(12) United States Patent
Kim et al.

(10) Patent No.: US 12,243,522 B2
(45) Date of Patent: Mar. 4, 2025

(54) APPARATUS FOR PROCESSING USER COMMANDS AND OPERATION METHOD THEREOF

(71) Applicant: Samsung Electronics Co., Ltd., Gyeonggi-do (KR)

(72) Inventors: Duseok Kim, Gyeonggi-do (KR); Suneung Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 284 days.

(21) Appl. No.: 17/883,050

(22) Filed: Aug. 8, 2022

(65) Prior Publication Data
US 2022/0383873 A1 Dec. 1, 2022

Related U.S. Application Data

(63) Continuation of application No. PCT/KR2022/000084, filed on Jan. 10, 2022.

(30) Foreign Application Priority Data

Mar. 9, 2021 (KR) .......................... 10-2021-0030952

(51) Int. Cl.
*G10L 15/22* (2006.01)
*G06F 40/279* (2020.01)
(Continued)

(52) U.S. Cl.
CPC .............. *G10L 15/22* (2013.01); *G06F 40/279* (2020.01); *G10L 15/06* (2013.01);
(Continued)

(58) Field of Classification Search
CPC ..... G10L 15/22; G10L 15/06; G10L 15/1815; G10L 15/30; G10L 2015/223;
(Continued)

(56) References Cited

U.S. PATENT DOCUMENTS 5,199,089 A * 3/1993 Campbell ............ G02B 6/3878
385/32
6,081,782 A * 6/2000 Rabin ..................... G10L 17/22
704/251

(Continued)

FOREIGN PATENT DOCUMENTS

JP 2008-145722 6/2008
KR 10-2015-0078266 7/2015
(Continued)

*Primary Examiner* — Abul K Azad
(74) *Attorney, Agent, or Firm* — The Farrell Law Firm, P.C.

(57) ABSTRACT

Methods and devices are provided in which one or more identifiers are registered based on a user setting made by a user of an electronic device. Each of the one or more identifiers corresponds to at least one activated service module. A registered identifier, of the one or more identifiers, is extracted from a user command input through an input device. The user command is changed using a basic identifier preset for a first service module corresponding to the registered identifier. The changed user command is transmitted to a server configured to control execution of the first service module. A result of executing the changed user command based on the first service module is received from the server.

20 Claims, 9 Drawing Sheets

(51) Int. Cl.
*G10L 15/06* (2013.01)
*G10L 15/18* (2013.01)
*G10L 15/30* (2013.01)

(52) U.S. Cl.
CPC .......... *G10L 15/1815* (2013.01); *G10L 15/30* (2013.01); *G10L 2015/223* (2013.01); *G10L 2015/228* (2013.01)

(58) Field of Classification Search
CPC ........... G10L 2015/228; G10L 15/1822; G10L 15/26; G10L 17/02; G06F 40/279; G06F 40/30; G06F 3/16; G06F 16/33; G06F 16/38; G06F 3/167; G06F 16/3344; G06F 16/381; Y10S 715/978
USPC ....................................................... 704/275

See application file for complete search history.

(56) References Cited

U.S. PATENT DOCUMENTS

| | | | |
|---|---|---|---|
| 7,272,212 B2 | 9/2007 | Eberle et al. | |
| 9,363,372 B2 | 6/2016 | Wu et al. | |
| 10,199,051 B2 | 2/2019 | Binder et al. | |
| 11,100,922 B1* | 8/2021 | Mutagi | G06F 3/167 |
| 2002/0193998 A1* | 12/2002 | Dvorak | G10L 15/30 |
| | | | 704/E15.047 |
| 2005/0190897 A1 | 9/2005 | Eberle et al. | |
| 2012/0260294 A1 | 10/2012 | Reichardt et al. | |
| 2014/0222436 A1 | 8/2014 | Binder et al. | |
| 2015/0023481 A1 | 1/2015 | Wu et al. | |
| 2015/0189179 A1* | 7/2015 | Eom | H04N 23/631 |
| | | | 348/231.2 |

FOREIGN PATENT DOCUMENTS

| | | |
|---|---|---|
| KR | 10-2016-0098771 | 8/2016 |
| KR | 10-2019-0072249 | 6/2019 |
| KR | 10-2020-0015314 | 2/2020 |
| KR | 10-2020-0063346 | 6/2020 |

* cited by examiner

APPARATUS FOR PROCESSING USER COMMANDS AND OPERATION METHOD THEREOF

CROSS-REFERENCE TO RELATED APPLICATIONS

This application is a Bypass Continuation Application of International Application No. PCT/KR2022/000084, filed on Jan. 10, 2022, which is based on and claims the benefit of a Korean Patent Application No. 10-2021-0030952, filed on Mar. 9, 2021 in the Korean Intellectual Property Office, the entire disclosure of each of which is incorporated herein by reference.

BACKGROUND

1. Field

The disclosure relates to generally an apparatus for processing a user command, and more particularly, to an apparatus and a method for processing user commands based on service modules.

2. Description of Related Art

An assistant function for performing predetermined functions and services by recognizing user commands of various forms, such as, for example, a user utterance, through user terminals, such as, for example, smartphones, tablet personal computers (PCs), and the like has been provided. An assistant system may control functions of terminals, which are connected to the system, to provide various services, and to provide services associated with content providers or third party service providers. There is a need to develop a platform on which services and functions associated with various service providers are provided through an assistant system in a terminal.

SUMMARY

Embodiments of the disclosure may provide a technology for using, by a name set by a user, a function of a service module installed in a user command processing system, which is configured to recognize a user command and perform the function related to the user command.

According to an aspect, an electronic device is provided that includes an input device, a communication interface, and at least one processor electrically connected to the input device and the communication interface. The processor is configured to register one or more identifiers based on a user setting made by a user of the electronic device. Each of the one or more identifiers corresponds to at least one activated service module The processor is also configured to extract a registered identifier, of the one or more identifiers, from a user command input through the input device, and change the user command using a basic identifier preset for a first service module corresponding to the registered identifier. The processor is further configured to transmit the changed user command to a server configured to control execution of the first service module, and receive, from the server, a result of executing the changed user command based on the first service module.

According to an aspect, a server is provided that includes at least one processor configured to receive a user command from a user terminal, and extract a registered identifier from the user command by referring to a database (DB) that stores at least one identifier registered for at least one service module. The at least one processor is also configured to change the user command using a basic identifier preset for a first module corresponding to the registered identifier, and control the first service module to be executed based on the changed user command.

According to an aspect, an operation method of an electronic device is provided that includes registering one or more identifiers based on a user setting made by a user of the electronic device. Each of the one or more identifiers corresponds to at least one activated service module. A registered identifier, of the one or more identifiers, is extracted from a user command input through an input device. The user command is changed using a basic identifier preset for a first service module corresponding to the registered identifier. The changed user command is transmitted to a server configured to control execution of the first service module. A result of executing the changed user command based on the first service module is received from the server.

According to an aspect, an operation method of a server is provided that includes receiving a user command from a user terminal. A registered identifier is extracted from the user command by referring to a DB that stores at least one identifier registered for at least one service module. The user command is changed using a basic identifier preset for a first service module corresponding to the registered identifier. The first service module is controlled to be executed based on the changed user command.

According to an aspect, a non-transitory computer-readable storage medium is provided that stores instructions. When executed by a processor, the instructions cause the processor to register one or more identifiers based on a user setting made by a user of the electronic device. Each of the one or more identifiers corresponding to at least one activated service module. The instructions also cause the processor to extract a registered identifier, of the one or more identifiers, from a user command input through an input device, and change the user command using a basic identifier preset for a first service module corresponding to the registered identifier. The instructions further cause the processor to transmit the changed user command to a server configured to control execution of the first service module, and receive, from the server, a result of executing the changed user command based on the first service module.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
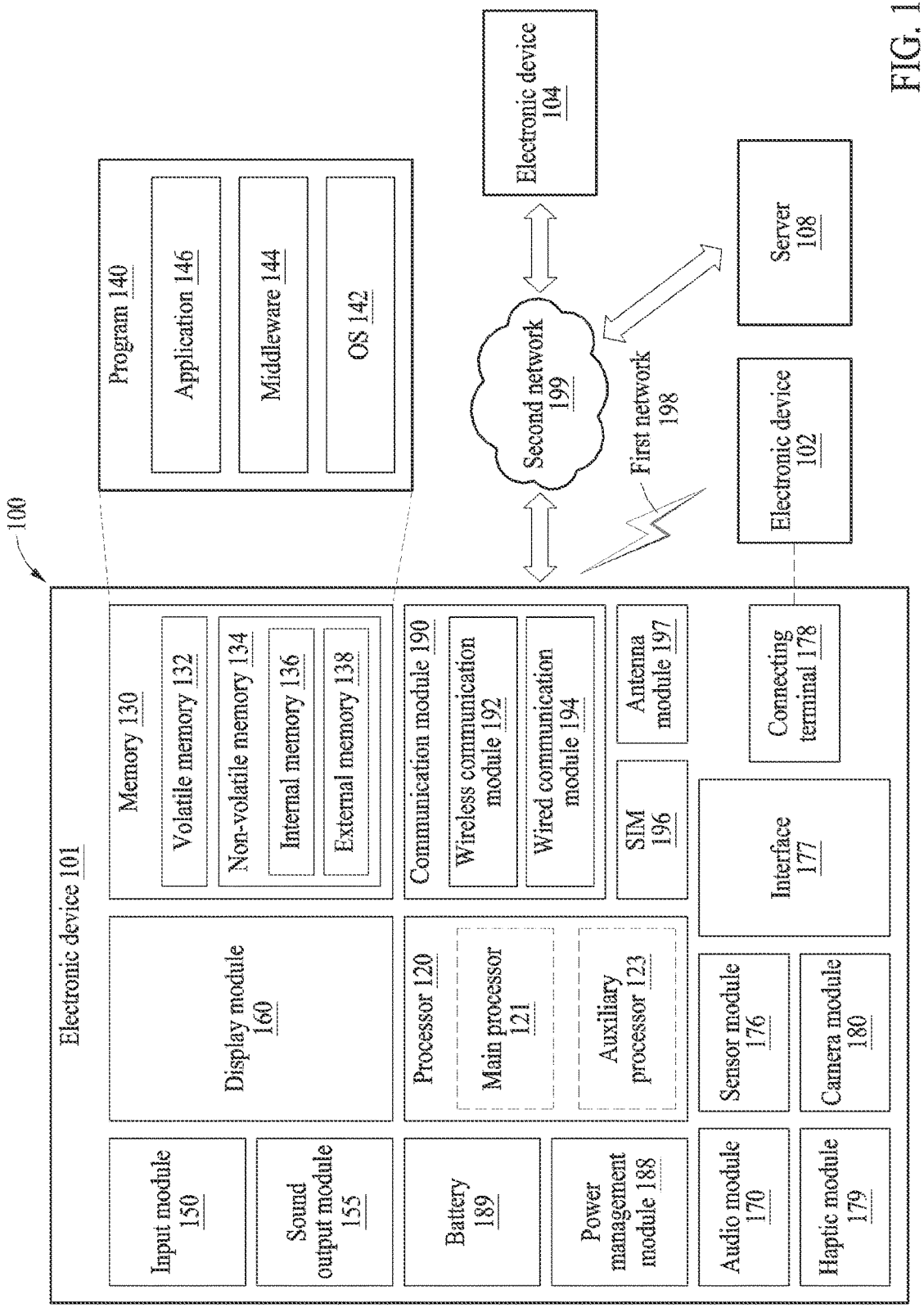
FIG. 1 is a block diagram illustrating an electronic device in a network environment, according to an embodiment.

Hereinafter, various example embodiments will be described in greater detail with reference to the accompanying drawings. When describing the example embodiments with reference to the accompanying drawings, like reference numerals refer to like elements and a repeated description related thereto will be omitted.

FIG. 1 is a block diagram illustrating an electronic device in a network environment, according to an embodiment. Referring to FIG. 1, an electronic device 101 in a network environment 100 may communicate with an electronic device 102 via a first network 198 (e.g., a short-range wireless communication network), or communicate with at least one of an electronic device 104 and a server 108 via a second network 199 (e.g., a long-range wireless communication network). The electronic device 101 may communicate with the electronic device 104 via the server 108. The electronic device 101 includes a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. At least one (e.g., the connecting terminal 178) of the above components may be omitted from the electronic device 101, or one or more other components may be added in the electronic device 101. Some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. As at least a part of data processing or computation, the processor 120 may store a command or data received from another component (e.g., the sensor module 176 or the communication module 190) in a volatile memory 132, process the command or data stored in the volatile memory 132, and store resulting data in a non-volatile memory 134. The processor 120 includes a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with, the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). The auxiliary processor 123 (e.g., an ISP or a CP) may be implemented as a portion of another component (e.g., the camera module 180 or the communication module 190) that is functionally related to the auxiliary processor 123. The auxiliary processor 123 (e.g., an NPU) may include a hardware structure specified for artificial intelligence (AI) model processing. An AI model may be generated by machine learning. Such learning may be performed by, for example, the electronic device 101 in which the AI model is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The data may include, for example, software (e.g., the program 140) and input data or output data for a command related thereto. The memory 130 includes the volatile memory 132 or the non-volatile memory 134. The non-volatile memory 134 includes an internal memory 136 and an external memory 138.

The program 140 may be stored as software in the memory 130, and includes, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing records. The receiver may be used to receive an incoming call. The receiver may be implemented separately from the speaker or as a part of the speaker.

The display module 160 may visually provide information to the outside (e.g., a user) of the electronic device 101. The display module 160 may include, for example, a display, a hologram device, or a projector, and a control circuitry to control a corresponding one of the display, the hologram device, and the projector. The display module 160 may include a touch sensor adapted to sense a touch, or a pressure sensor adapted to measure an intensity of a force incurred by the touch.

The audio module 170 may convert a sound into an electric signal or vice versa. The audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with an external electronic device (e.g., the electronic device 102) directly (e.g., wiredly) or wirelessly. The interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). The connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. The haptic module 179 may include, for example, a motor, a piezoelectric element, or an electric stimulator.

The camera module 180 may capture a still image and moving images. The camera module 180 may include one or more lenses, image sensors, ISPs, or flashes.

The power management module 188 may manage power supplied to the electronic device 101. The power management module 188 may be implemented as, for example, at least a part of a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more communication processors that are operable independently of the processor 120 (e.g., an AP) and that support direct (e.g., wired) communication or wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large scale antenna. The wireless communication module 192 may support various requirements specified in the electronic device 101, an external electronic device (e.g., the electronic device 104), or a network system (e.g., the second network 199). The wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. Another component (e.g., a radio frequency integrated circuit (RFIC)) other than the radiating element may be additionally formed as a part of the antenna module 197.

The antenna module 197 may form a mmWave antenna module. The mmWave antenna module may include a PCB, an RFIC disposed on a first surface (e.g., a bottom surface) of the PCB or adjacent to the first surface and capable of supporting a designated high-frequency band (e.g., the mmWave band), and a plurality of antennas (e.g., array antennas) disposed on a second surface (e.g., a top or a side surface) of the PCB or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general-purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the external electronic devices 102 and 104 may be a device of the same type as or a different type from the electronic device 101. All or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least a part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least a part of a reply to the request. To that end, a cloud computing, distributed computing, mobile edge computing (MEC), or client-server computing technology may be used, for example. The electronic device 101 may provide ultra-low latency services using, e.g., distributed computing or mobile edge computing. For example, the external electronic device 104 may include an Internet-of-things (IoT) device. The server 108 may be an intelligent server using machine learning and/or a neural network. The external electronic device 104 or the server 108 may be included in the second network 199. The electronic device 101 may be applied to intelligent services (e.g., smart home, smart city, smart car, or healthcare) based on 5G communication technology or IoT-related technology.

An electronic device may be a device of various types. The electronic device may include, for example, a portable communication device (e.g., a mobile phone, a smartphone, etc.), a computing device (e.g., a laptop computer, a personal digital assistant (PDA), etc.), a portable multimedia device, a portable medical device, a camera, a wearable device, a home appliance (e.g., a television (TV), a white home appliance, etc.), a head-mounted display (HMD), or a smart speaker. However, the electronic device is not limited to the foregoing examples.

It should be understood that various example embodiments of the present disclosure and the terms used therein are not intended to limit the technological features set forth herein to some particular embodiments but include various changes, equivalents, or replacements of the example embodiments. In connection with the description of the drawings, like reference numerals may be used for similar or related components. It should be understood that a singular form of a noun corresponding to an item may include one or more of the things, unless the relevant context clearly indicates otherwise. As used herein, "A or B," "at least one of A and B," "at least one of A or B," "A, B, or C," "at least one of A, B, and C," and "A, B, or C," each of which may include any one of the items listed together in the corresponding one of the phrases, or all possible combinations thereof. Although terms of "first" or "second" are used to explain various components, the components are not limited to the terms. These terms should be used only to distinguish one component from another component. For example, a first component may be referred to as a second component, or similarly, and the second component may be referred to as the first component within the scope of the right according to the concept of the present disclosure. It should also be understood that, when a component (e.g., a first component) is referred to as being "connected to" or "coupled to" another component with or without the term "functionally" or "communicatively," the component can be connected or coupled to the other component directly (e.g., wiredly), wirelessly, or via a third component.

As used in connection with various example embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, the module may be implemented in the form of an application-specific integrated circuit (ASIC).

Various embodiments set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities, and some of the multiple entities may be separately disposed in different components. One or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
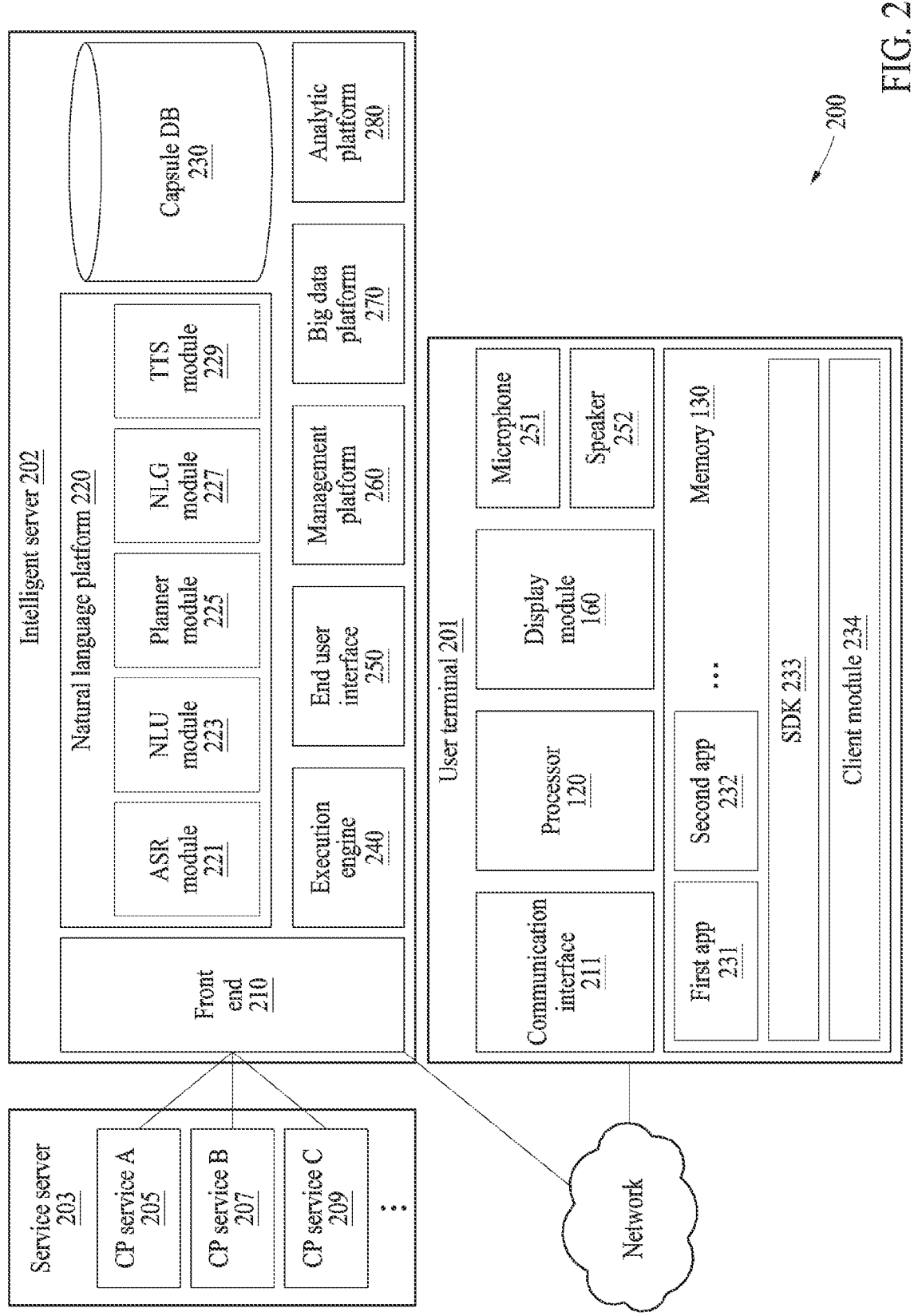
FIG. 2 is a block diagram illustrating an integrated intelligence system, according to an embodiment.

FIG. 2 is a block diagram illustrating an integrated intelligence system, according to an embodiment.

Referring to FIG. 2, an integrated intelligence system 200 includes a user terminal 201, an intelligent server 202, and a service server 203.

The user terminal 201 includes a communication interface 211, a microphone 251 (such as input module 150 of FIG. 1), a speaker 252 (such as sound output module 155 of FIG. 1), the display module 160, the memory 130, and/or the processor 120. The components listed above may be operationally or electrically connected to each other.

The communication interface 211 may be connected to an external device to transmit and receive data to and from the external device. The microphone 251 may receive a sound (e.g., a user utterance) and convert the sound into an electrical signal. The speaker 252 may output the electrical signal as a sound (e.g., a voice or speech).

The display module 160 may display an image or video. The display module 160 may also display a GUI of an app (or an application program) being executed. The display module 160 may receive a touch input through a touch sensor. For example, the display module 160 may receive a text input through the touch sensor in an on-screen keyboard area displayed on the display module 160.

The memory 130 may store a client module 234, a software development kit (SDK) 233, and a plurality of apps (a first app 231 and a second app 232). The client module 234 and the SDK 233 may configure a framework (or a solution program) for performing general-purpose functions. In addition, the client module 234 or the SDK 233 may configure a framework for processing a user input (e.g., a voice input, a text input, and a touch input).

The apps 231 and 232 stored in the memory 130 may be programs for performing designated functions. The apps 231 and 232 may include a plurality of actions for performing respectively designated functions. For example, the apps 231 and 232 may include an alarm app, a message app, and/or a scheduling app. The apps 231 and 232 may be executed by the processor 120 to sequentially execute at least a portion of the actions.

The processor 120 may control the overall operation of the user terminal 201. For example, the processor 120 may be electrically connected to the communication interface 211, the microphone 251, the speaker 252, and the display module 160 to perform a designated operation.

The processor 120 may also perform a designated function by executing a program stored in the memory 130. For example, the processor 120 may execute at least one of the client module 234 or the SDK 233 to perform the following operations for processing a user input. The processor 120 may control the actions of the apps 231 and 232 through the SDK 233. The following operations described as operations of the client module 234 or the SDK 233 may be operations to be performed by the execution of the processor 120.

The client module 234 may receive a user input. For example, the client module 234 may receive a voice signal corresponding to a user utterance sensed through the microphone 251. Alternatively, the client module 234 may receive a touch input sensed through the display module 160. Alternatively, the client module 234 may receive a text input sensed through a keyboard or an on-screen keyboard. The client module 234 may receive, as non-limiting examples, various types of input sensed through an input module included in the user terminal 201 or an input module connected to the user terminal 201. The client module 234 may transmit the received user input to the intelligent server 202. The client module 234 may transmit state information of the user terminal 201 together with the received user input to the intelligent server 202. The state information may be, for example, execution state information of an app.

The client module 234 may also receive a result corresponding to the received user input. For example, when the intelligent server 202 is capable of calculating the result corresponding to the received user input, the client module 234 may receive the result corresponding to the received user input. The client module 234 may display the received result on the display module 160, and output the received result in audio through the speaker 252.

The client module 234 may receive a plan corresponding to the received user input. The client module 234 may display, on the display module 160, execution results of executing a plurality of actions of an app according to the plan. For example, the client module 234 may sequentially display the execution results of the actions on the display module 160, and output the execution results in audio through the speaker 252. In another example, the user terminal 201 may display only an execution result of executing a portion of the actions (e.g., an execution result of the last action) on the display module 160, and output the execution result in audio through the speaker 252.

The client module 234 may receive a request for obtaining information necessary for calculating the result corresponding to the user input from the intelligent server 202. The client module 234 may transmit the necessary information to the intelligent server 202 in response to the request.

The client module 234 may transmit information on the execution results of executing the actions according to the plan to the intelligent server 202. The intelligent server 202 may verify that the received user input has been correctly processed using the information.

The client module 234 may include a speech recognition module. The client module 234 may recognize a voice input for performing a limited function through the speech recognition module. For example, the client module 234 may execute an intelligent app for processing a voice input to perform an organic action through a designated input (e.g., Wake up!).

The intelligent server 202 may receive information related to the user input from the user terminal 201 through a communication network. The intelligent server 202 may change data related to a received voice input into text data. The intelligent server 202 may generate a plan for performing a task corresponding to the voice input based on the text data.

The plan may be generated by an AI system. The AI system may be a rule-based system or a neural network-based system (e.g., a feedforward neural network (FNN) or a recurrent neural network (RNN)). Alternatively, the AI system may be a combination thereof or another AI system. The plan may be selected from a set of predefined plans or may be generated in real time in response to a user request. For example, the AI system may select at least one plan from among the predefined plans.

The intelligent server 202 may transmit a result according to the generated plan to the user terminal 201 or transmit the generated plan to the user terminal 201. The user terminal 201 may display the result according to the plan on the display module 160. The user terminal 201 may display a result of executing an action according to the plan on the display module 160.

The intelligent server 202 includes a front end 210, a natural language platform 220, a capsule database (DB) 230, an execution engine 240, an end user interface 250, a management platform 260, a big data platform 270, and/or an analytic platform 280.

The front end 210 may receive a user input from the user terminal 201. The front end 210 may transmit a response corresponding to the user input.

The natural language platform 220 includes an automatic speech recognition (ASR) module 221, a natural language understanding (NLU) module 223, a planner module 225, a natural language generator (NLG) module 227, and/or a text-to-speech (TTS) module 229.

The ASR module 221 may convert a voice input received from the user terminal 201 into text data. For example, the NLU module 223 may understand an intention of a user by performing a syntactic or semantic analysis on a user input in the form of text data. The NLU module 223 may understand semantics of a word extracted from the user input using a linguistic feature (e.g., a grammatical element) of a morpheme or phrase, and determine the intention of the user by matching the semantics of the word to the intention.

The planner module 225 may generate a plan using the intention and a parameter determined by the NLU module 223. The planner module 225 may determine a plurality of domains required to perform a task based on the determined intention. The planner module 225 may determine a plurality of actions included in each of the domains determined based on the intention. The planner module 225 may determine a parameter required to execute the determined actions or a resulting value output by the execution of the actions. The parameter and the resulting value may be defined as a concept of a designated form (or class). Accordingly, the plan may include a plurality of actions and a plurality of concepts determined by a user intention. The planner module 225 may determine a relationship between the actions and the concepts stepwise (or hierarchically). For example, the planner module 225 may determine an execution order of the actions determined based on the user intention, based on the concepts. The planner module 225 may determine the execution order of the actions based on the parameter required for the execution of the actions and results output by the execution of the actions. Accordingly, the planner module 225 may generate the plan including connection information (e.g., ontology) between the actions and the concepts. The planner module 225 may generate the plan using information stored in the capsule DB 230 that stores a set of relationships between concepts and actions.

The NLG module 227 may change designated information to the form of a text. The information changed to the form of a text may be in the form of a natural language utterance. The TTS module 229 may change the information in the form of a text to information in the form of a speech.

All or some of the functions of the natural language platform 220 may also be implemented in the user terminal 201.

The capsule DB 230 may store therein information about relationships between a plurality of concepts and a plurality of actions corresponding to a plurality of domains. A capsule may include a plurality of action objects (or action information) and concept objects (or concept information) included in a plan. The capsule DB 230 may store a plurality of capsules in the form of a concept action network (CAN). The capsules may be stored in a function registry included in the capsule DB 230.

The capsule DB 230 may include a strategy registry that stores strategy information necessary for determining a plan corresponding to a user input, for example, a voice input. The strategy information may include reference information for determining one plan when there are a plurality of plans corresponding to the user input. The capsule DB 230 may include a follow-up registry that stores information on follow-up actions for suggesting a follow-up action to the user in a designated situation. The follow-up action may include, for example, a follow-up utterance. The capsule DB 230 may include a layout registry that stores layout information of information output through the user terminal 201. The capsule DB 230 may include a vocabulary registry that stores vocabulary information included in capsule information. The capsule DB 230 may include a dialog registry that stores information on a dialog (or an interaction) with the user. The capsule DB 230 may update the stored objects through a developer tool. The developer tool may include, for example, a function editor for updating an action object or a concept object. The developer tool may include a vocabulary editor for updating a vocabulary. The developer tool may include a strategy editor for generating and registering a strategy for determining a plan. The developer tool may include a dialog editor for generating a dialog with the user. The developer tool may include a follow-up editor for activating a follow-up objective and editing a follow-up utterance that provides a hint. The follow-up objective may be determined based on a currently set objective, a preference of the user, or an environmental condition. The capsule DB 230 may also be implemented in the user terminal 201.

The execution engine 240 may calculate a result using a generated plan. The end user interface 250 may transmit the calculated result to the user terminal 201. Accordingly, the user terminal 201 may receive the result and provide the received result to the user. The management platform 260 may manage information used by the intelligent server 202. The big data platform 270 may collect data of the user. The analytic platform 280 may manage a quality of service (QoS) of the intelligent server 202. For example, the analytic platform 280 may manage the components and processing rate (or efficiency) of the intelligent server 202.

The service server 203 may provide a designated service (e.g., CP service A 205, CP service B 207, and/or CP service C 209), such as, food ordering or hotel reservation, to the user terminal 201. The service server 203 may be a server operated by a third party. The service server 203 may provide the intelligent server 202 with information to be used for generating a plan corresponding to a received user input. The provided information may be stored in the capsule DB 230. In addition, the service server 203 may provide resulting information according to the plan to the intelligent server 202.

In the integrated intelligence system 200 described above, the user terminal 201 may provide various intelligent services to a user in response to a user input. The user input may include, for example, an input through a physical button, a touch input, or a voice input.

The user terminal 201 may provide a speech recognition service through an intelligent app (or a speech recognition app) stored therein. In this case, the user terminal 101 may recognize a user utterance or a voice input received through the microphone 251, and provide a service corresponding to the recognized voice input to the user.

The user terminal 201 may perform a designated action alone or together with the intelligent server 202 and/or the service server 203 based on the received voice input. For example, the user terminal 201 may execute an app corresponding to the received voice input and perform the designated action through the executed app.

When the user terminal 201 provides the service together with the intelligent server 202 and/or the service server 203, the user terminal 201 may detect a user utterance using the microphone 251 and generate a signal (or voice data) corresponding to the detected user utterance. The user terminal 201 may transmit the voice data to the intelligent server 202 using the communication interface 211.

The intelligent server 202 may generate, as a response to the voice input received from the user terminal 201, a plan for performing a task corresponding to the voice input or a result of performing an action according to the plan. The plan may include, for example, a plurality of actions for performing the task corresponding to the voice input of the user, and a plurality of concepts related to the actions. The concepts may define parameters input to the execution of the actions or resulting values output by the execution of the actions. The plan may include connection information between the actions and the concepts.

The user terminal 201 may receive the response using the communication interface 211. The user terminal 201 may output a voice signal generated in the user terminal 201 to the outside using the speaker 252, or output an image generated in the user terminal 201 to the outside using the display module 160.

Figure 3:
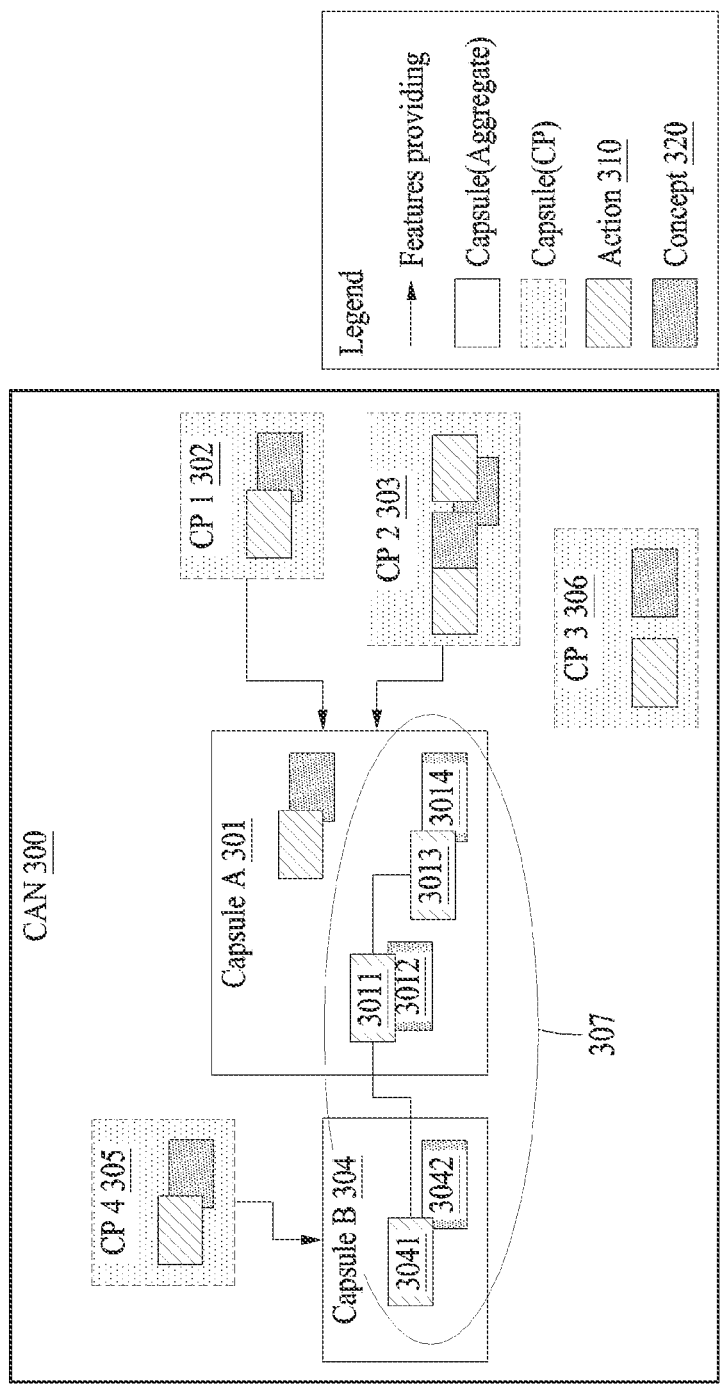
FIG. 3 is a diagram illustrating a form in which concept and action relationship information is stored in a DB, according to an embodiment.

FIG. 3 is a diagram illustrating a form in which concept and action relationship information is stored in a DB, according to an embodiment.

A capsule DB 230 of an intelligent server 202 may store therein capsules in the form of a concept action network (CAN) 300. The capsule DB may store, in the form of the CAN 300, actions for processing a task corresponding to a voice input of a user and parameters necessary for the actions. The CAN 300 includes a capsule A 301, a capsule B 304, and service providers CP 1 302, CP 2 303, CP 3 306, and CP 4 305.

The capsule DB may store a plurality of capsules, for example, the capsule A 301 and the capsule B 304, respectively corresponding to a plurality of domains (e.g., applications). One capsule (e.g., the capsule A 301) may correspond to one domain (e.g., a location (geo) application). In addition, one capsule (e.g., the capsule A 301) may correspond to at least one service provider (e.g., CP1 302 and/or CP 303) for performing a function for a domain related to the capsule. One capsule may include at least one action 310 for performing a designated function and at least one concept 320.

A natural language platform 220 may generate a plan for performing a task corresponding to a received voice input using the capsules stored in the capsule DB. For example, a planner module 225 of the natural language platform may generate the plan using the capsules stored in the capsule DB. The planner module may generate a plan 307 using actions 3011 and 3013 and concepts 3012 and 3014 of the capsule A 301 and using an action 3041 and a concept 3042 of the capsule B 304.

Figure 4:
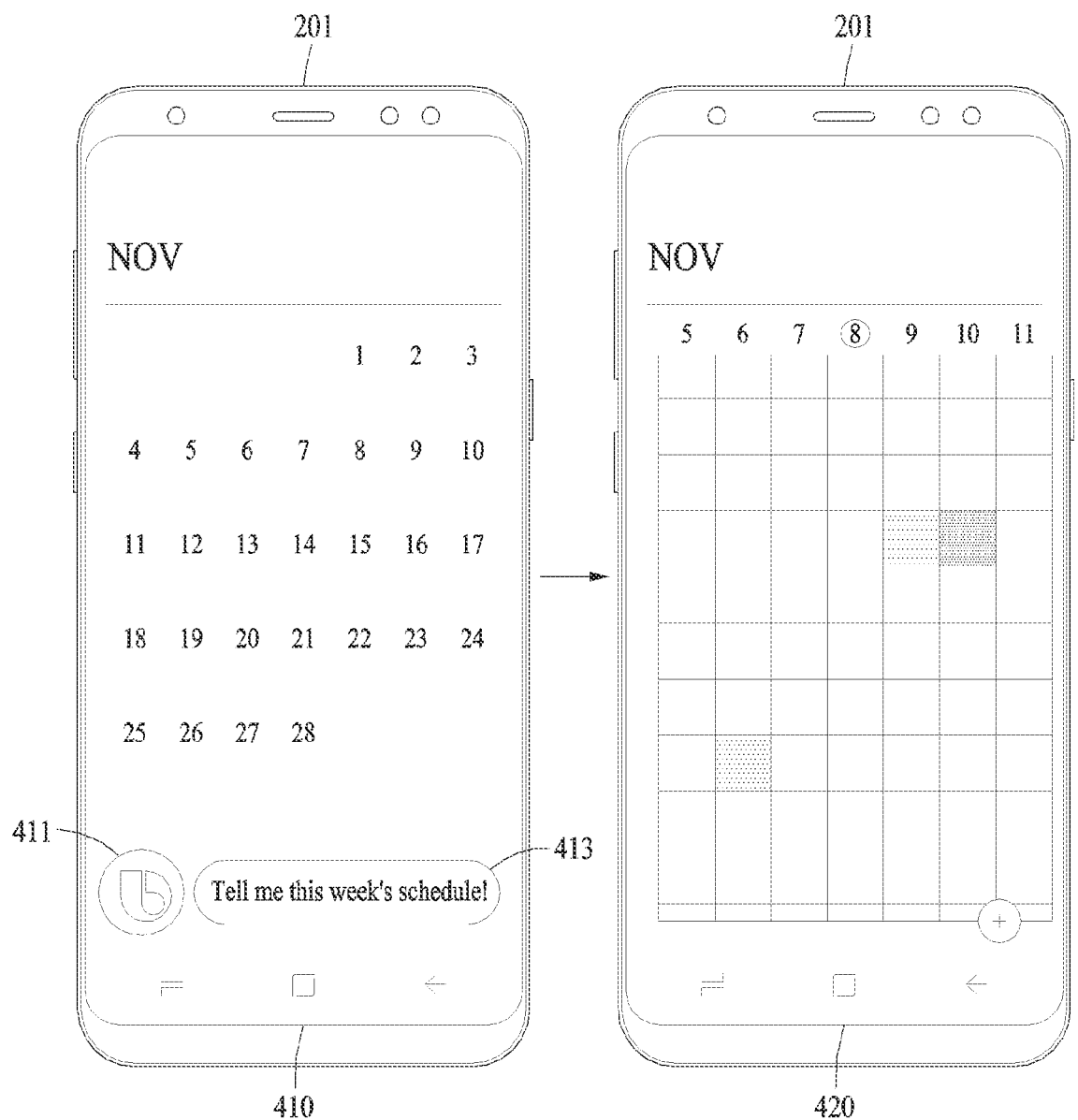
FIG. 4 is a diagram illustrating screens showing that a user terminal processes a received voice input through an intelligent app, according to an embodiment.

FIG. 4 is a diagram illustrating screens showing that a user terminal processes a received voice input through an intelligent app, according to an embodiment.

Referring to FIG. 4, the user terminal 201 may execute an intelligent app to process a user input through an intelligent server 202.

On a first screen 410, when a designated voice input (e.g., "wake up") is recognized or an input through a hardware key (e.g., a dedicated hardware key) is received, the user terminal 201 may execute the intelligent app for processing the voice input. The user terminal 201 may execute the intelligent app, for example, while a scheduling app is being executed. The user terminal 101 displays an object (e.g., an icon) 411 corresponding to the intelligent app on a display module 160. The user terminal 201 may receive a voice input made by a user utterance. For example, the user terminal 201 receives a voice input "tell me this week's schedule" The user terminal 201 displays a user interface (UI) 413 (e.g., an input window) of the intelligent app in which text data of the received voice input is displayed.

On a second screen 420, the user terminal 201 displays a result corresponding to the received voice input on the display. For example, the user terminal 201 may receive a plan corresponding to a received user input and display, on the display, this week's schedule according to the plan.

Figure 5:
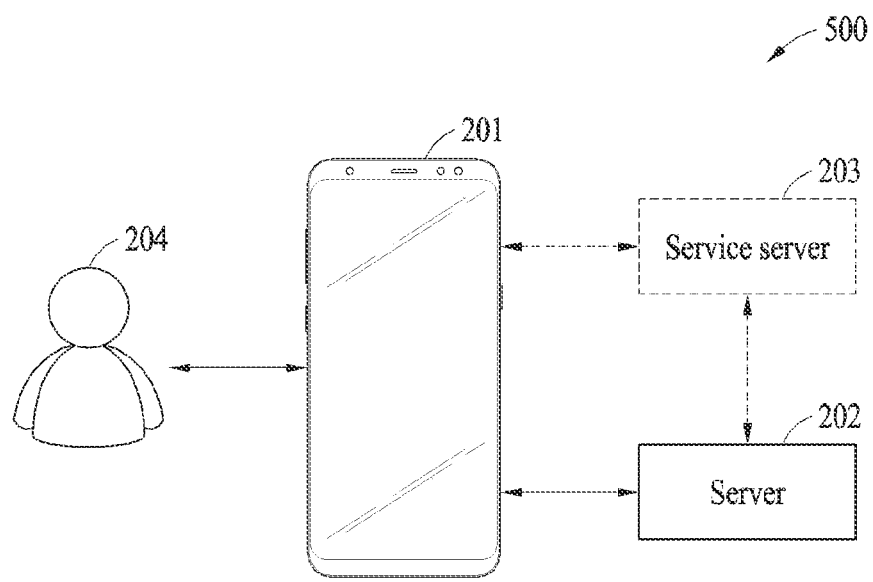
FIG. 5 is a diagram illustrating an operation of a user command processing system, according to an embodiment.

FIG. 5 is a diagram illustrating an operation of a user command processing system, according to an embodiment.

Referring to FIG. 5, a user command processing system 500 includes the user terminal 201, the server 202, and a user 204. The user 204 may input data through an interface provided in the user terminal 201, and receive data output through an interface provided in the user terminal 201.

The user terminal 201 may receive a user command from the user 204 using an input module (e.g., the input module 150 of FIG. 1 or the microphone 251 of FIG. 2) included in the user terminal 201. The user command may be received in the form of a voice signal or a text. For example, the user terminal 201 may receive a user command in the form of a voice signal of "tell me the lunch menu at restaurant A" through a microphone, or receive a user command in the form of a text of "tell me the lunch menu at restaurant A" through a keyboard.

The user terminal 201 may transmit the received user command to the server 202 and receive response information associated with a response to the user command from the server 202. The response information may be generated as the server 202 processes data for the user command or the server 202 further performs data communication with a service server (e.g., the server 108 of FIG. 1 or the service server 203 of FIG. 2). For example, response information associated with a response to a user command of "tell me the lunch menu at restaurant A" may be generated as the server 202 further performs data communication with the service server 203 of restaurant A.

The user terminal 201 may process a user command into a form to be processible by the server 202 and transmit it to the server 202. For example, in the user terminal 201, a user command in the form of a voice signal may be converted into the form of a text through a speech recognition module, and a portion of the user command may be converted into a parameter recognizable by the server 202.

A user command may include an identifier and a command corresponding to a service module (e.g., the capsules 301 and 304 of FIG. 3). The identifier corresponding to the service module may be a keyword indicating the service module and may correspond to a command (e.g., a call command) for executing a specific activated service module. The server 202 may recognize the identifier corresponding to the service module included in the user command and control the execution of the service module. The identifier corresponding to the service module may include a text corresponding to a specific pattern. The text corresponding to the pattern may indicate a text arranged according to a preset rule. Hereinafter, for the convenience of description, the identifier will be described as a keyword as an example.

The identifier corresponding to the service module may include at least one of a basic identifier corresponding to the service module, a candidate identifier, and a user-defined identifier defined by the user 204. The basic identifier may be an identifier set as a default for the service module, and may correspond to an identifier set in advance by a service provider as an identifier corresponding to the service module. The basic identifier may be a unique name of an individual service module determined to be distinguished from other service modules, and may be determined as a name that is not duplicated with a basic identifier of other service modules. The identifier corresponding to the service module may further include similar identifier(s) that may be recognized as the same as the basic identifier. For example, the identifier corresponding to the service module may further include similar identifiers that may be recognized as one corresponding to the basic identifier, such as, for example, an abbreviated form, a Korean/English converted form, and the like of the basic identifier. A similar identifier included in the user command may be recognized as the basic identifier.

The candidate identifier may be an identifier that may be set as an identifier of the service module according to a user setting, and may include at least one identifier set in advance by the service provider. The user 204 may set a portion of candidate identifiers set in advance by the service provider as identifiers corresponding to a specific service module. For example, a first candidate identifier selected as an identifier by the user 204 from among a plurality of candidate identifiers set in advance for a specific service module by the service provider may be applied as an identifier corresponding to the service module. In this example, a second candidate identifier not selected as an identifier by the user 204 from among the candidate identifiers may not be applied as the identifier corresponding to the service module.

For example, a first service module may include a basic identifier A, and candidate identifiers B and C. The basic identifier A and the candidate identifiers B and C may correspond to identifiers set in advance for the first service module by a provider of the first service module. In this example, when the user 204 does not set an identifier corresponding to the first service module, the identifier corresponding to the first service module may be set as a default which is the basic identifier A. The user 204 may select at least one from among the candidate identifiers B and C as the identifier corresponding to the first service module. When the user 204 selects the candidate identifier B as the identifier corresponding to the first service module, the candidate identifier B may be set as the identifier corresponding to the first service module. In such a case, the identifiers A and B may correspond to the identifier corresponding to the first service module.

The user-defined identifier may be an identifier defined by the user 204 as an identifier corresponding to a service module, and the user 204 may arbitrarily define at least one identifier and set it as the identifier corresponding to the service module. For example, the user 204 may set D as the identifier corresponding to the first service module. In this example, the basic identifier A corresponding to the first service module and the identifier D defined by the user 204 may correspond to the identifier corresponding to the first service module. The user 204 may further set the candidate identifier B of the first service module as the identifier corresponding to the first service module. In this case, the identifiers A, B, and D may correspond to the identifier corresponding to the first service module.

The command may include at least a portion of the user command excluding the identifier corresponding to the service module. For example, when a user command of "tell me the lunch menu at restaurant A" is received, "restaurant A" may correspond to an identifier corresponding to a specific service module, and "tell me the lunch menu" or "lunch menu" may be a command corresponding to the service module.

The command may include an identifier corresponding to the service module. For example, in a user command of "tell me the lunch menu," "lunch menu" may correspond to an identifier corresponding to a specific service module, and "tell me the lunch menu" including the service module identifier or "lunch menu" which is the service module identifier itself may correspond to the command.

The service module may be a module that performs a service in response to a user command, and may correspond to a unit for performing a specific function or service. The service module may be distinguished according to a type of a domain corresponding to the service module and/or a service provider (or a providing entity). For example, the service module may be implemented to execute a specific function or service through a platform provided by the server 202.

For example, a first service module may be installed (or stored) in the server 202, and correspond to a first application (or a first service capsule) operated by a first service provider (e.g., a restaurant business company A).

In another example, a second service module may be installed (or stored) as a default in the server 202, and correspond to a second application (e.g., a gallery or a second service capsule) operated by a manufacturer (or a subscribed communication company of the user terminal 201.

In yet another example, a third service module may be provided by a third service provider operating a speech recognition service system (e.g., Siri and Bixby), and correspond to a third service capsule related to a specific topic (e.g., navigation).

Substantially the same services may be provided based on different service modules. For example, a menu providing service by a restaurant business company A may be provided by an application installed in the user terminal 201, or may be provided independently of the execution of the application installed in the user terminal 201. The user terminal 201 may receive data (e.g., UI data) needed for providing a service from the outside (e.g., the service server 203 operated by the restaurant business company A) of the user terminal 201, and provide the service based on the received data.

The user terminal 201 may set whether to activate the service module. For example, when a service module is installed in the user terminal 201, the service module may be activated in the user terminal 201. Alternatively, the user terminal 201 may set whether to use an installed service module to set whether to activate the service module.

The server 202 may execute the service module based on the user command, and may obtain a response to the user command based on a result of executing the service module. The server 202 may process the user command to execute the service module.

The user command may be received in the form of a voice signal or in the form of a text. The user command received in the form of a voice signal by the user terminal 201 may be transmitted to the server 202, and be converted into a sentence in the form of a text through an ASR module 221.

The server 202 may process the user command input in the form of a text or the user command converted into the form of a text from the form of a voice signal by the ASR module. For example, the server 202 may extract, from a user command, an identifier and a command corresponding to a service module, and process the user command into a form for executing the service module corresponding to the extracted identifier.

For example, the server 202 may analyze the user command through NLU processing, and convert the user command into a parameter for executing the service module by understanding or identifying an intention of the user 204. In the NLU processing, information about the service module corresponding to the identifier may be considered.

Information about one or more service modules may be stored in the user terminal 201 or an external device (e.g., the server 202 or the service server 203). For example, information about a service module may include at least one of identification information of the service module, a category (e.g., restaurants or food) of a domain corresponding to the service module, a list of services (providing an entry on the menu of a restaurant, ordering food, etc.) that may be provided to the user 204 based on the service module, and a common topic of the services that may be provided to the user 204.

The server 202 may receive a response to a user command from a service module by transferring a parameter obtained by processing the user command to the service module. The service module may execute the user command, and output a result of executing the user command and provide the result to the server 202. The result of executing the user command by the service module may be provided to the user terminal 201 through the server 202.

A service module may access the service server 203 corresponding to the service module and perform at least a portion of a function or service. For example, the server 202 may access the service server 203 through a service module installed in the server 202. At least a portion of a user command may be processed in the service server 202 accessible through the service module. In this case, the service server 203 may provide a response to the user command to the user terminal 201 through the server 202, or directly communicate with the user terminal 201 to provide the response to the user command to the user terminal 201.

Figure 6:
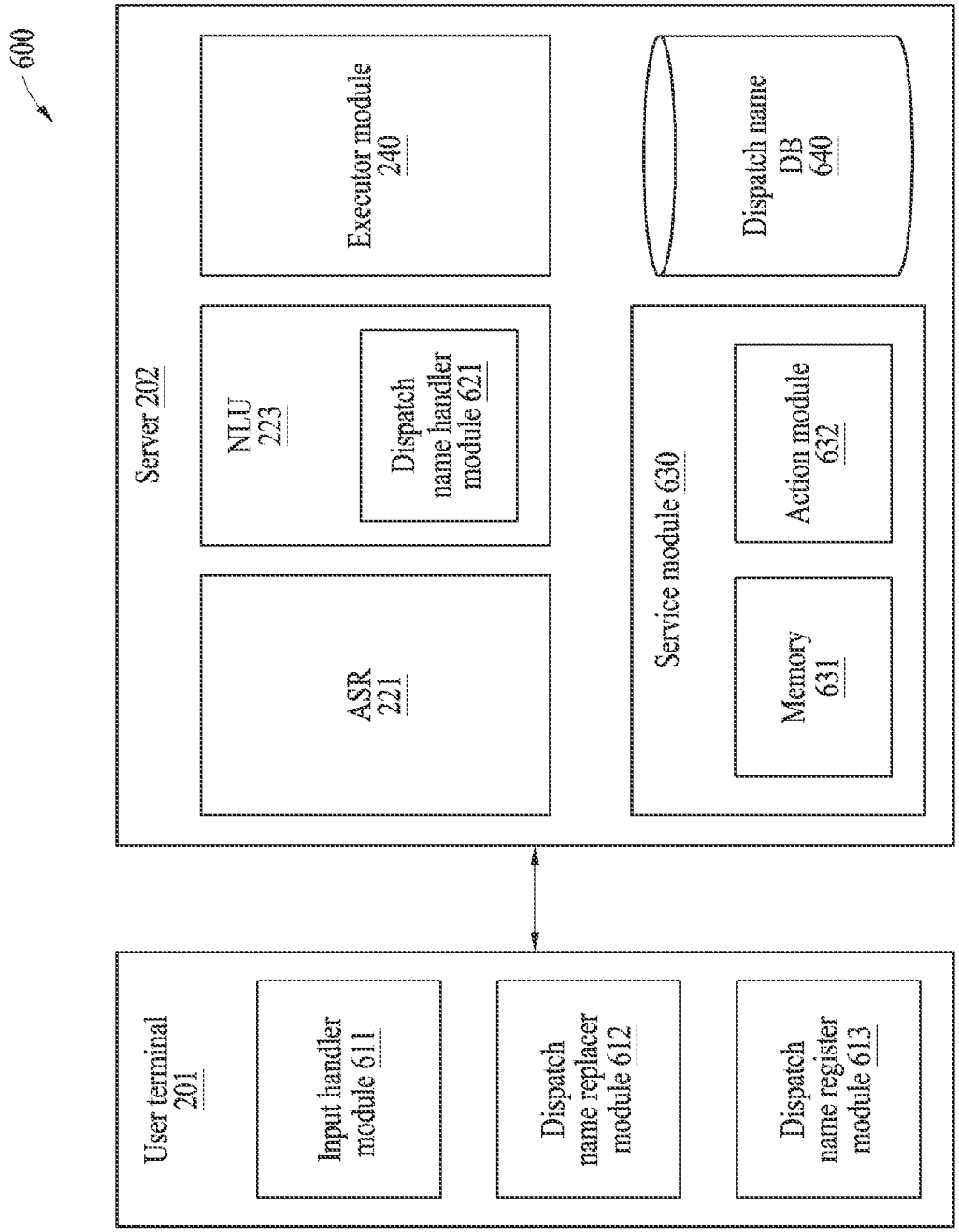
FIG. 6 is a block diagram illustrating a user command processing system, according to an embodiment.

FIG. 6 is a block diagram illustrating a user command processing system, according to an embodiment.

Referring to FIG. 6, a user command processing system 600 includes the user terminal 201, and the server 202 having a dispatch name DB 640. Hereinafter, an identifier corresponding to a service module, which is described above, will be referred to as a dispatch name of the service module.

The user terminal 201 includes an input handler module 611, a dispatch name replacer module 612, and a dispatch name register module 613. At least a portion of the modules 611, 612, and 613 of the user terminal 201 may be included in the client module 234 of FIG. 2.

The input handler module 611 may obtain a user command in the form of a text. The input handler module 611 may obtain the user command that is converted into the form of a text from the form of a voice signal received from a user. For example, the input handler module 611 may transmit the user command in the form of a voice signal received from the user to an ASR module 221 of the server 202 and receive the user command converted into the form of a text corresponding to the voice signal. The input handler module 611 may include a speech recognition module, and may convert a voice signal into a text without passing through the server 202. For example, when a user command in the form of a text is input from the user, such an operation of converting the user command by the input handler module 611 may not be performed.

The dispatch name replacer module 612 may extract a dispatch name from the user command in the form of a text, and change the extracted dispatch name to a basic identifier of the corresponding service module. The extracted dispatch name may correspond to a dispatch name registered for the service module in the user terminal 201. As described above, the dispatch name of the service module may include a basic identifier set as a default for the service module, and include at least one candidate identifier and/or at least one user-defined identifier according to a user setting.

A dispatch name registered for a service module may be stored in the dispatch name DB 640. The dispatch name DB 640 may store therein at least one dispatch name that is set for each service module. For example, the dispatch name DB 640 may store therein at least one of a default dispatch name (e.g., a basic identifier) corresponding to a first service module, a generic dispatch name (e.g., a candidate identifier), and a personalized dispatch name (e.g., a user-defined identifier).

The dispatch name DB 640 may store therein dispatch names by classifying the dispatch names into a default dispatch name or a dispatch name (e.g., a generic dispatch name or a personalized dispatch name) registered according to a user setting. For example, the dispatch names stored in the dispatch name DB 640 may include flags that are distinguished according to a type of a dispatch name (e.g., a default dispatch name type, a generic dispatch name type, and a personalized dispatch name type), and types of the dispatch names may thereby be distinguished.

The dispatch name DB 640 may be included in the server 202. Dissimilar to the example illustrated in FIG. 6, the dispatch name DB 640 may be included in the user terminal 201. The dispatch name DB 640 may be a DB in which a dispatch name registered by a user setting is stored, and a separate DB in which a default dispatch name corresponding to a service module is stored may be present.

The dispatch name replacer module 612 may extract a dispatch name from a user command in the form of a text based on a text analysis algorithm. For example, the text analysis algorithm may include a deep learning-based natural language processing algorithm such as a pattern matching algorithm and a keyword extraction algorithm. For example, the dispatch name replacer module 612 may extract the dispatch name from the user command by searching for the dispatch name stored in the dispatch name DB 640 from a text corresponding to the user command based on the pattern matching algorithm.

Such an operation of extracting a dispatch name may be performed by the server 202, and the dispatch name replacer module 612 may obtain the extracted dispatch name from the server 202. The operation of extracting a dispatch name performed by the server 202 will be described in detail hereinafter.

The dispatch name replacer module 612 may determine whether the extracted dispatch name corresponds to a dispatch name registered by a user setting (e.g., a generic dispatch name and a personalized dispatch name) or a default dispatch name. The dispatch name replacer module 612 may access the dispatch name DB 640 to determine whether the dispatch name corresponds to the dispatch name registered by the user setting. When extracting a dispatch name from a user command, the dispatch name replacer module 612 may extract the dispatch name by distinguishing a dispatch name registered by the user setting and a default dispatch name.

When the extracted dispatch name is a dispatch name registered by the user setting, the dispatch name replacer module 612 may change the dispatch name in the user command to a default dispatch name corresponding to the corresponding service module. For example, the dispatch name replacer module 612 may access the dispatch name DB 640 to obtain the default dispatch name of the service module corresponding to the registered dispatch name. The dispatch name replacer module 612 may change the user command by changing the dispatch name extracted from the user command to the obtained default dispatch name.

The dispatch name replacer module 612 may transmit the user command including the default dispatch name to the server 202. The server 202 may analyze the user command including the default dispatch name, and control the execution of a service module 630 corresponding to the default dispatch name. Such an operation of analyzing a user command and controlling the execution of the service module 630 by the server 202 is described in greater detail below.

For the convenience of description, the modules 611, 612, and 613 included in the user terminal 201 of FIG. 6 may be divided into functional units performed in the user terminal 201, which may be an exemplary configuration of the user terminal 201. The functions or operations performed by the modules 611, 612, and 613 may be executed by at least one processor of the user terminal 201.

An electronic device (or the user terminal 201) is provided that includes an input device, a communication interface; and at least one processor electrically connected to the input device and the communication interface. The processor is configured to register one or more identifiers based on a user setting made by a user of the electronic device, each of the one or more identifiers corresponding to at least one activated service module, extract a registered identifier, of the one or more identifiers, from a user command input through the input device, change the user command using a basic identifier preset for a first service module corresponding to the registered identifier, transmit the changed user command to a server configured to control execution of the first service module, and receive, from the server, a result of executing the changed user command based on the first service module.

When registering the one or more identifiers, the processor may perform at least one of an operation of registering a user-defined identifier for at least one service module 630 or an operation of registering at least one identifier selected by the user from among at least one candidate identifier preset for the at least one service module 630.

The input device may include a microphone. When extracting the registered identifier, the processor may obtain a text corresponding to a voice signal input through the microphone, and extract the registered identifier from the obtained text.

When extracting the registered identifier from the user command, the processor may obtain a pattern matching result between the user command and the one or more identifiers registered by the user setting, and extract the registered identifier from the user command based on the obtained pattern matching result.

When extracting the registered identifier, the processor may extract, from the user command, the registered identifier and information about the first service module corresponding to the registered identifier by referring to a DB that stores identifiers corresponding to service modules.

The server 202 includes the ASR module, the NLU module 223 having a dispatch name handler module, the executor module or engine 240, and the at least one service module 630.

The ASR module 221 may recognize a user command in the form of a voice signal received from the user terminal 201 and convert the received user command into a user command in the form of a text. The user command converted into a text by the ASR module 221 may be transmitted to and processed in the user terminal 201 or may be processed in the server 202.

The NLU module 223 may analyze the user command based on an NLU algorithm. The NLU module 223 may extract a dispatch name from the user command in the form of a text based on a text analysis algorithm. The NLU module 223 may perform at least a portion of a dispatch name extracting operation performed by the dispatch name replacer module 612 of the user terminal 201.

The dispatch name handler module 621 may identify a service module corresponding to the dispatch name extracted from the user command. The identified service module (e.g., a first service module) may correspond to a service module that performs an operation corresponding to the received user command. For example, when the dispatch name extracted from the user command is a default dispatch name, a service module corresponding to the extracted dispatch name may be identified. For example, the service module corresponding to the extracted dispatch name may be identified by comparing the dispatch name to a default dispatch name stored in a memory 631 of the service module 630.

For example, when the dispatch name extracted from the user command is a dispatch name registered by a user setting, the dispatch name handler module 621 may identify a service module corresponding to the dispatch name by referring to the dispatch name DB 640. Alternatively, by referring to the dispatch name DB 640, the dispatch name handler module 621 may obtain a default dispatch name corresponding to the dispatch name registered by the user setting and identify a corresponding service module based on the obtained default dispatch name.

Although the dispatch name hander module 621 is illustrated in FIG. 6 as being included in the NLU module 223, examples are not limited thereto, and a module independently operating from the NLU module 223 may be included.

The NLU module 223 may determine an intention of the user by analyzing the user command based on the NLU algorithm. The NLU module 223 may obtain a parameter corresponding to at least one operation executed in the identified service module based on the determined intention. The NLU module 223 may obtain information about the service module identified as corresponding to the extracted dispatch name, and use the obtained information about the service module to analyze the user command. For example, based on the information about the identified service module, a parameter corresponding to the intention determined from the user command may be obtained.

The NLU module 223 may transmit, to the identified service module, the parameter obtained from the user command. The executor module 240 may control the service module 630 to execute an operation defined in the service module 630 according to the intention of the user or the parameter obtained from the NLU module 223.

The service module 630 includes the memory 631 and an action module 632. The memory 631 may store therein a default dispatch name set in advance for a service module. The memory 631 may store at least one generic dispatch name set in advance for a service module and/or at least one similar dispatch name (e.g., similar identifier) that is recognized as the same as the default dispatch name. Also, the memory 631 may store therein a resource for executing the service module 630. The action module 632 may include information about an operation performed by the service module 630 in response to a request from the user.

The executor module 240 may control the service module 630 such that a specific function or operation of the service module 630 is performed based on the parameter obtained by the NLU module 223 by using the action module 632 of the service module 630. An execution result of the service module 630 may be provided to the user terminal 201. The execution result of the service module 630 may be provided to the user terminal 201 in a form that may be output from the user terminal 201, such as, for example, in a visual form or an auditory form.

Although the service module 630 is illustrated in FIG. 6 as being included in the server 202, the service module 630 may be stored outside the server 202. For example, the service module 630 may be stored in a service server 203 that is connected to the server 202 and operates the service module 630, or be stored in a DB accessible by the server 202.

For the convenience of description, the modules 221, 223, 621, 630, and 640 included in the server 202 of FIG. 6 may be divided into functional units performed in the server 202, which is an example of the configuration of the server 202. Functions or operations performed by the modules 221, 223, 621, 630, and 640 may be executed by at least one processor included in the server 202.

A server is provided that includes at least one processor configured to receive a user command from a user terminal, and extract a registered identifier from the user command by referring to a DB that stores at least one identifier registered for at least one service module. The at least one processor is also configured to change the user command using a basic identifier preset for a first module corresponding to the registered identifier, and control the first service module to be executed based on the changed user command.

When receiving the user command, the processor may convert the user command in a form of a voice signal into a form of a text by recognizing the user command in the form of the voice signal.

When extracting the registered identifier from the user command, the processor may analyze a text of the user command based on a text analysis algorithm, and identify the registered identifier from the user command based on a result of analyzing the text.

When changing the user command, the processor may change the registered identifier to the basic identifier in the user command.

When controlling the first service module to be executed, the processor may determine an intention of the user by analyzing the changed user command based on an NLU module, obtain a parameter corresponding to at least one operation to be executed in the first service module based on the determined intention, and transmit the obtained parameter to the first service module to control the execution of the first service module.

Figure 7A:
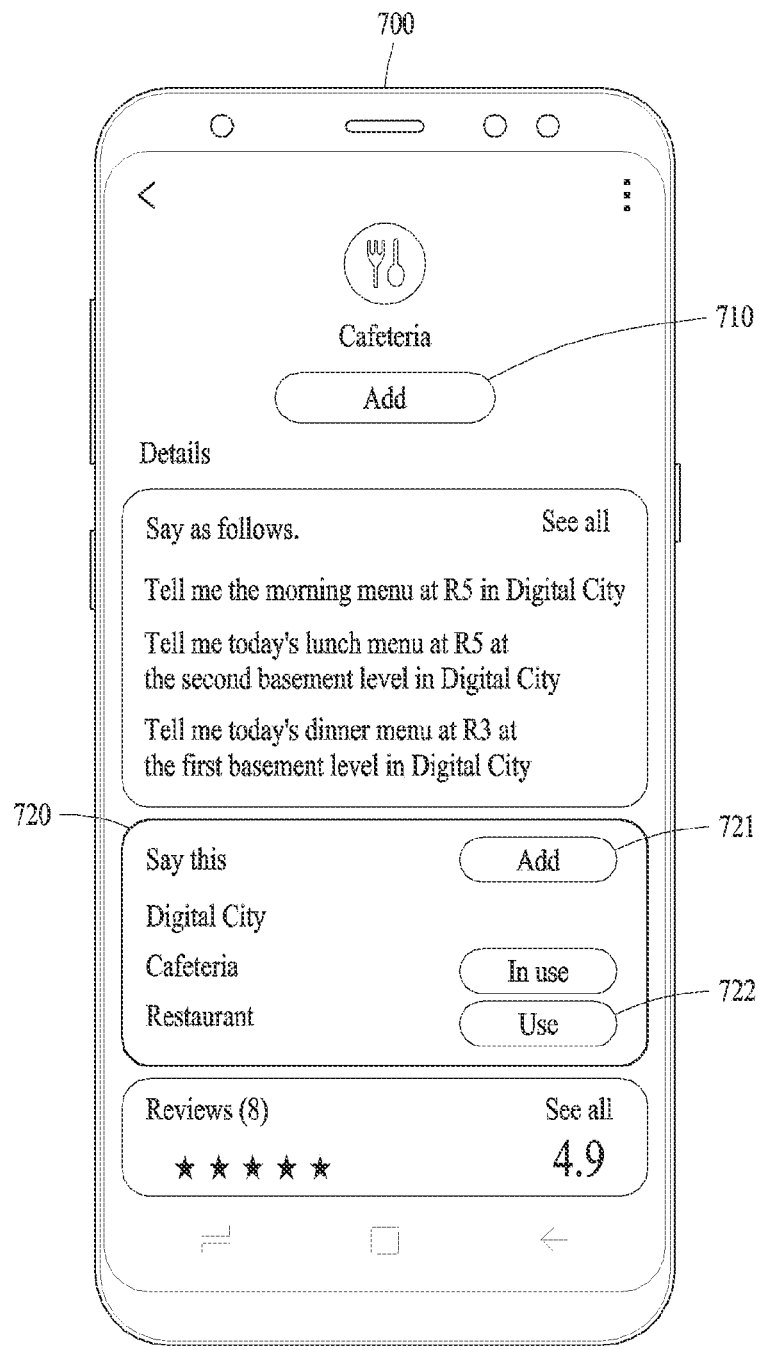
FIGS. 7A through 7C are diagrams illustrating examples of setting a dispatch name, according to an embodiment.
Figure 7B:
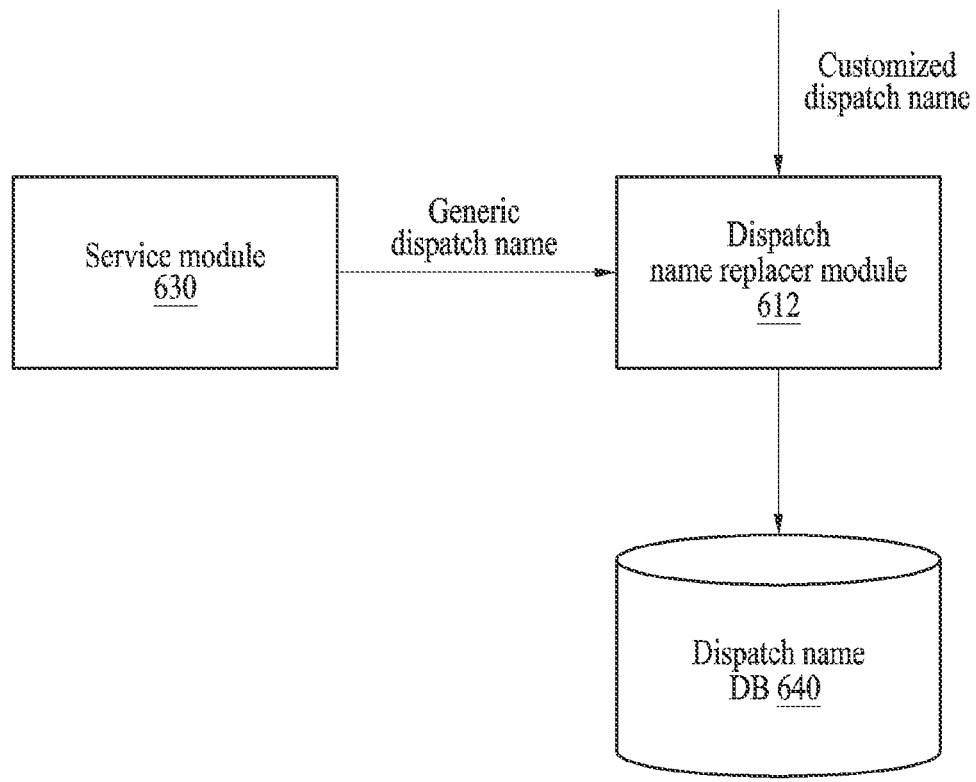
Figure 7C:
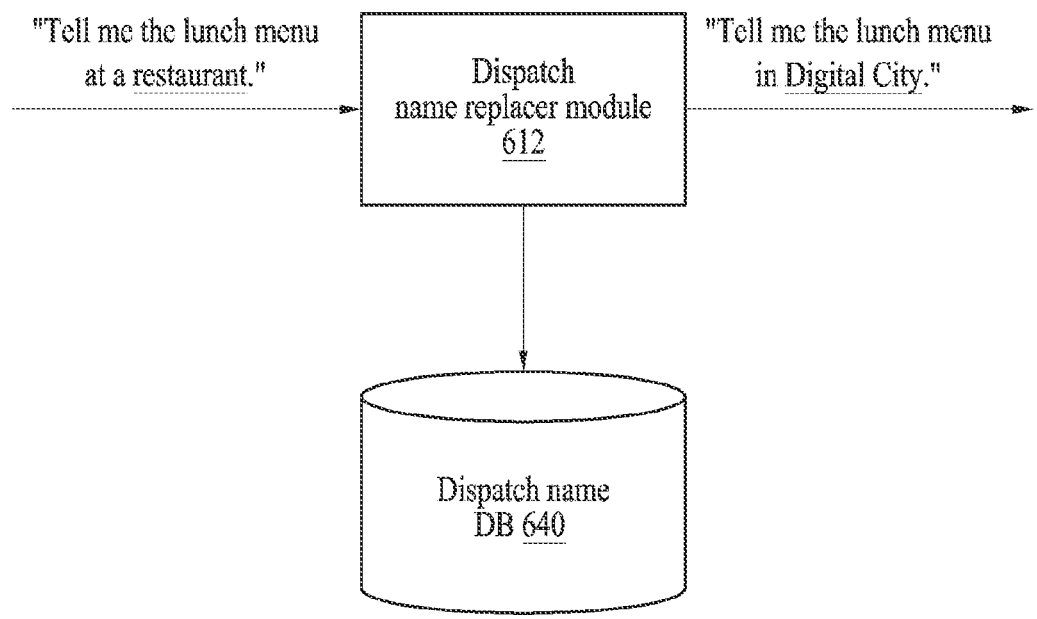

FIGS. 7A through 7C are diagrams illustrating examples of setting a dispatch name, according to an embodiment.

Referring to FIG. 7A, a server may provide a user terminal with an interface 700 for setting a service module (e.g., the capsules 301 and 304 of FIG. 3 or the service module 630 of FIG. 6). A user may set whether to activate the service module through the interface 700 provided to the user terminal, and set a dispatch name of the activated service module.

For example, the user may activate a "cafeteria" service module through an interfacing object 710 for service module activation in the interface 700. The activated cafeteria service module may respond to a user command to perform a function defined in the cafeteria service module. An execution result of the service module may be provided to the user terminal through the interface 700.

The interface 700 includes an interfacing object 720 for displaying a registrable dispatch name corresponding to the service module and registering (or setting) the dispatch name. The interfacing object 720 may display "Digital City" as a default dispatch name of the service module. In addition, the interfacing object 720 may provide a function of displaying generic dispatch names "cafeteria" and "restaurant" which may be registered as the dispatch name of the service module, and setting registration of a generic dispatch name and a personalized dispatch name.

The user may change the setting of the dispatch name corresponding to the activated service module. For example, the user may register, as the dispatch name of the service module, "cafeteria" and/or "restaurant" which is a generic dispatch name corresponding to the cafeteria service module through the interface 700. When the generic dispatch name of "cafeteria" is registered, the cafeteria service module may perform a certain function in response to the user command even when the user command includes "cafeteria."

The interface 700 may display a generic dispatch name registered by the user as a dispatch name of a service module and a generic dispatch name not registered as the dispatch name by distinguishing them. For example, a generic dispatch name of "cafeteria" may be displayed as "in use" to indicate that it is a generic dispatch name registered by the user as a dispatch name of a corresponding service module, and a generic dispatch name of "restaurant" may not be displayed as "in use" to indicate that it is an unregistered generic dispatch name. The user may register the generic dispatch name through an interfacing object 722, which is "use" displayed on the right side of the generic dispatch name of "restaurant."

The user may register, as a dispatch name, an arbitrary keyword defined by the user for the service module activated through the interface 700. For example, the user may register a keyword as a personalized dispatch name of a "cafeteria" service module through the interfacing object 721, which is "add."

The user may request that at least one of generic dispatch names corresponding to a service module be registered as a dispatch name of the service module through the interface 700 provided to the user terminal. When there is a request for registration of a dispatch name, the user terminal may perform a dispatch name registering operation by storing, in a DB 640, the dispatch name for which the request is made for the service module.

Referring to FIG. 7B, the dispatch name replacer module 612 of the user terminal may perform the dispatch name registering operation by storing, in the dispatch name DB 640, a personalized (or customized) dispatch name or a generic dispatch name for which a registration request is made for a corresponding service module. A generic dispatch name corresponding to the service module 630 may be stored in advance in the memory 631 of FIG. 6 of the service module. The service module 630 may provide at least one preset generic dispatch name stored in the memory to the user terminal through an interface.

When a keyword requested by the user to be registered as a dispatch name corresponding to a service module is a pre-registered dispatch name, the server may recognize that the requested dispatch name is duplicated with the pre-registered dispatch name and notify the user of this. For example, the server may transmit a message informing that the requested keyword is duplicated with an already registered dispatch name through an interface of the user terminal. Also, when the requested keyword is duplicated with a pre-registered dispatch name registered for another service module, the server may provide the user terminal with an interface for selecting a service module for which the duplicate dispatch name is to be registered. When the user maintains the request for the registration of the duplicate keyword, the server may cancel the registration of the duplicate dispatch name and register the keyword requested by the user as the dispatch name corresponding to the service module.

An activated service module may perform a specific function or operation in response to a user command including a default dispatch name. For example, when a "cafeteria" service module is activated, a specific function of the cafeteria service module may be performed in response to a user command including "Digital City" which is a default dispatch name of the cafeteria service module.

When a generic dispatch name and/or a personalized dispatch name is registered for an activated service module, the activated service module may perform a specific function or operation in response to a user command even when the user command includes a registered generic dispatch name or personalized dispatch name. For example, when a generic dispatch name of "cafeteria" is registered for a corresponding service module, a specific function of the service module may be performed in response to a user command including "cafeteria."

Referring to FIG. 7C, when a dispatch name extracted from a user command corresponds to a generic dispatch name or a personalized dispatch name that is registered as a dispatch name of a service module, the dispatch name replacer module 612 of the user terminal may change a dispatch name registered by a user setting by referring to the dispatch name DB 640.

For example, when an input user command corresponds to "tell me the lunch menu at a restaurant," and "restaurant" corresponds to a personalized dispatch name registered as a dispatch name of a service module by a user setting, the dispatch name replacer module 612 may change "restaurant" to "Digital City" which is a default dispatch name of the service module by referring to the dispatch name DB 640. That is, the user command may be changed to "tell me the lunch menu in Digital City" through a dispatch name replacing operation performed by the dispatch name replacer module 612. The service module corresponding to the default dispatch name may be executed by the user command changed to include the default dispatch name.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:
1. An electronic device, comprising:
an input device;
a communication interface; and
at least one processor electrically connected to the input device and the communication interface, wherein the processor is configured to:
register one or more identifiers based on a user setting made by a user of the electronic device, each of the one or more identifiers corresponding to at least one activated service module;
extract an identifier from a user command input through the input device by referring to a database that stores registered identifiers corresponding to the activated service module;
determine whether the extracted identifier is a basic identifier preset for a first service module when the extracted identifier is one of the registered identifiers corresponding to the first service module among the activated service module;
change the user command by replacing the extracted identifier with the basic identifier preset for the first service module when the extracted identifier is not the basic identifier preset for the first service module;
transmit the changed user command to a server configured to control execution of the first service module; and
receive, from the server, a result of executing the changed user command based on the first service module,
wherein the server identifies the first service module as corresponding to the user command based on the basic identifier included in the changed user command, and converts the changed user command into parameters for executing the first service module.

2. The electronic device of claim 1, wherein, in determining whether the extracted identifier is the basic identifier preset for the first service module, the processor is configured to:
determine the extracted identifier as the basic identifier preset for the first service module when a flag included in the extracted identifier indicates a basic identifier type,
wherein each of the registered identifiers stored in the database includes a flag indicating an identifier type,
wherein the identifier type includes a basic identifier type, a candidate identifier type, and a user-defined identifier type.

3. The electronic device of claim 1, wherein, in extracting the identifier from the user command, the processor is further configured to:
obtain a result of pattern matching of the user command and the one or more identifiers stored in the database by the user setting; and
extract the identifier from the user command based on the obtained result.

4. The electronic device of claim 1, wherein the processor is further configured to:
output the result of executing the changed user command,
wherein the result of executing the changed user command is generated by executing one or more actions in the first service module according to a plan generated based on an intention and the parameters determined by natural language processing of the user command on the server,
wherein the plan includes:
the actions determined based on the intention; and
the concepts including the parameters required to execute the actions and results output by executing the actions.

5. The electronic device of claim 1, wherein, in registering the one or more identifiers, the processor is further configured to:

perform at least one of an operation of registering a user-defined identifier for at least one of the activated service module and an operation of registering at least one identifier selected by the user from among at least one preset candidate identifier corresponding to the activated service module.

6. The electronic device of claim 1, wherein:
the input device comprises a microphone; and
in extracting the identifier, the processor is further configured to:
obtain a text corresponding to a voice signal input through the microphone; and
extract the identifier from the obtained text.

7. A server, comprising:
at least one processor configured to:
receive a user command from a user terminal;
extract an identifier from the user command by referring to a database that stores registered identifiers corresponding to at least one service module;
identify a first service module as corresponding to the user command when the extracted identifier is a basic identifier preset for the first service module; and
control the first service module to be executed by converting the user command into parameters for executing the first service module.

8. The server of claim 7, wherein, in controlling the first service module to be executed, the processor is further configured to:
determine an intention of a user by analyzing the user command based on a natural language understanding (NLU) module;
obtain the parameters corresponding to at least one operation to be executed in the first service module based on the determined intention; and
control the first service module to be executed by transmitting the obtained parameter to the first service module.

9. The server of claim 8, wherein, in controlling the first service module to be executed by transmitting the obtained parameters to the first service module, the processor is further configured to:
generate a plan based on the determined intention and the obtained parameters; and
control the first service module to execute one or more actions based on the plan,
wherein the plan includes:
the actions determined based on the intention; and
the concepts including the parameters required to execute the actions and results output by executing the actions.

10. The server of claim 7, wherein, in extracting the identifier from the user command, the processor is further configured to:
analyze a text of the user command based on a text analysis algorithm; and
distinguish the identifier from the user command based on a result of analyzing the text.

11. The server of claim 7, wherein, in receiving the user command, the processor is further configured to:
convert the user command in a form of a voice signal into a form of a text by recognizing the user command in the form of the voice signal.

12. An operation method of an electronic device, the method comprising:
registering one or more identifiers based on a user setting made by a user of the electronic device, each of the one or more identifiers corresponding to at least one activated service module;
extracting an identifier from a user command input through an input device by referring to a database that stores registered identifiers corresponding to the activated service module;
determining whether the extracted identifier is a basic identifier preset for a first service module when the extracted identifier is one of the registered identifiers corresponding to the first service module among the activated service module;
changing the user command by replacing the extracted identifier with the basic identifier preset for the first service module when the extracted identifier is not the basic identifier preset for the first service module;
transmitting the changed user command to a server configured to control execution of the first service module; and
receiving, from the server, a result of executing the changed user command based on the first service module,
wherein the server identifies the first service module as corresponding to the user command based on the basic identifier included in the changed user command, and converts the changed user command into parameters for executing the first service module.

13. The method of claim 12, wherein determining whether the extracted identifier is the basic identifier preset for the first service module comprises:
determining the extracted identifier as the basic identifier preset for the first service module when a flag included in the extracted identifier indicates a basic identifier type,
wherein each of the registered identifiers stored in the database include flag indicating an identifier type,
wherein the identifier type includes a basic identifier type, a candidate identifier type, and a user-defined identifier type.

14. The method of claim 12, wherein receiving the result of executing the changed user command further comprises:
outputting the result of executing the changed user command,
wherein the result of executing the changed user command is generated by executing one or more actions in the first service module according to a plan generated based on an intention and the parameters determined by natural language processing of the user command on the server,
wherein the plan includes:
the actions determined based on the intention; and
the concepts including the parameters required to execute the actions and results output by executing the actions.

15. The method of claim 12, wherein registering the one or more identifiers comprises at least one of:
registering a user-defined identifier for at least one of the activated service module; and
registering at least one identifier selected by the user from among at least one preset candidate identifier corresponding to the activated service module.

16. The method of claim 12, wherein extracting the identifier comprises:
obtaining a text corresponding to a voice signal input through the input device; and
extracting the registered identifier from the obtained text.

17. An operation method of a server, the method comprising:
- receiving a user command from a user terminal;
- extracting an identifier from the user command by referring to a database that stores registered identifiers corresponding to at least one service module;
- identifying a first service module as corresponding to the user command when the extracted identifier is a basic identifier preset for the first service module; and
- controlling the first service module to be executed by converting the user command into parameters for executing the first service module.

18. The method of claim 17, wherein controlling the first service module to be executed comprises:
- determining an intention of the user by analyzing the user command based on a natural language understanding (NLU) module;
- obtaining the parameters corresponding to at least one operation to be executed in the first service module based on the determined intention; and
- controlling the first service module to be executed by transmitting the obtained parameter to the first service module.

19. The method of claim 17, wherein receiving the user command comprises:
- converting the user command in a form of a voice signal into a form of a text by recognizing the user command in the form of the voice signal.

20. A non-transitory computer-readable storage medium storing instructions that, when executed by a processor, cause the processor to perform the method of:
- registering one or more identifiers based on a user setting made by a user of the electronic device, each of the one or more identifiers corresponding to at least one activated service module;
- extracting an identifier from a user command input through an input device by referring to a database that stores registered identifiers corresponding to the activated service module;
- determining whether the extracted identifier is a basic identifier preset for a first service module when the extracted identifier is one of the registered identifiers corresponding to the first service module among the activated service module;
- changing the user command by replacing the extracted identifier with the basic identifier preset for the first service module when the extracted identifier is not the basic identifier preset for the first service module;
- transmitting the changed user command to a server configured to control execution of the first service module; and
- receiving, from the server, a result of executing the changed user command based on the first service module,
- wherein the server identifies the first service module as corresponding to the user command based on the basic identifier included in the changed user command, and converts the changed user command into parameters for executing the first service module.

* * * * *